United States Patent
Detlefs et al.

(10) Patent No.: US 7,860,847 B2
(45) Date of Patent: Dec. 28, 2010

(54) EXCEPTION ORDERING IN CONTENTION MANAGEMENT TO SUPPORT SPECULATIVE SEQUENTIAL SEMANTICS

(75) Inventors: David Detlefs, Westford, MA (US); John Joseph Duffy, Renton, WA (US); Goetz Graefe, Bellevue, WA (US); Vinod K. Grover, Mercer Island, WA (US); Michael M. Magruder, Sammamish, WA (US); Lingli Zhang, Goleta, CA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 11/820,556

(22) Filed: Jun. 20, 2007

(65) Prior Publication Data
US 2008/0120300 A1    May 22, 2008

Related U.S. Application Data

(63) Continuation-in-part of application No. 11/601,541, filed on Nov. 17, 2006.

(51) Int. Cl.
G06F 17/30 (2006.01)
(52) U.S. Cl. .................. 707/703; 707/704; 707/674; 707/675; 707/683
(58) Field of Classification Search ............ None
See application file for complete search history.

(56) References Cited

U.S. PATENT DOCUMENTS

| | | | |
|---|---|---|---|
| 4,884,228 A | 11/1989 | Stanley | |
| 5,241,675 A | 8/1993 | Sheth et al. | |
| 5,335,343 A | 8/1994 | Lampson et al. | |
| 5,701,480 A | 12/1997 | Raz | |
| 6,011,921 A | 1/2000 | Takahashi | |
| 6,014,741 A | 1/2000 | Mahalingaiah | |
| 6,016,399 A | 1/2000 | Chang | |
| 6,088,705 A | 7/2000 | Lightstone | |
| 6,557,048 B1 | 4/2003 | Keller | |
| 6,754,737 B2 | 6/2004 | Heynemann et al. | |
| 6,785,779 B2 | 8/2004 | Berg et al. | |
| 7,089,253 B2 | 8/2006 | Hinshaw et al. | |
| 7,146,366 B2 | 12/2006 | Hinshaw et al. | |

(Continued)

FOREIGN PATENT DOCUMENTS

EP      01197876 A2      4/2002

(Continued)

OTHER PUBLICATIONS

Costich Oliver, "Transaction Processing Using an Untrusted Scheduler in a Multilevel Database with Replicated Architecture", pp. 1-17.

(Continued)

*Primary Examiner*—Baoquoc To

(57) ABSTRACT

Various technologies and techniques are disclosed for handling exceptions in sequential statements that are executed in parallel. A transactional memory system is provided with a contention manager. The contention manager is responsible for managing exceptions that occur within statements that were designed to be executed in an original sequential order, and that were transformed into ordered transactions for speculative execution in parallel. The contention manager ensures that any exceptions that are thrown from one or more speculatively executed blocks while the statements are being executed speculatively in parallel are handled in the original sequential order.

12 Claims, 16 Drawing Sheets

U.S. PATENT DOCUMENTS

| | | | |
|---|---|---|---|
| 2003/0061255 | A1 | 3/2003 | Shah et al. |
| 2003/0078910 | A1 | 4/2003 | Kanai |
| 2003/0115276 | A1 | 6/2003 | Flaherty et al. |
| 2003/0120669 | A1 | 6/2003 | Han |
| 2004/0015642 | A1 | 1/2004 | Moir et al. |
| 2004/0148150 | A1 | 7/2004 | Ashar et al. |
| 2004/0236659 | A1 | 11/2004 | Cazalet et al. |
| 2005/0193286 | A1* | 9/2005 | Thatte et al. .......... 714/48 |
| 2005/0210185 | A1 | 9/2005 | Renick |
| 2005/0283769 | A1 | 12/2005 | Eichenberger et al. |
| 2006/0112248 | A1 | 5/2006 | Meiri et al. |
| 2006/0190504 | A1 | 8/2006 | Pruet, III |
| 2006/0218206 | A1 | 9/2006 | Bourbonnais et al. |
| 2007/0198518 | A1 | 8/2007 | Luchangco et al. |

FOREIGN PATENT DOCUMENTS

| | | |
|---|---|---|
| KR | 10-2005-0054380 A | 6/2005 |
| WO | WO 2007-016302 | 2/2007 |

OTHER PUBLICATIONS

Dekeyser, et al., "Conflict Scheduling of Transactions on XML Documents", Date: 2004, vol. 27, pp. 1-9.

Yeo, et al., "Linear Orderability of Transactions in Mobile Environment with Heterogeneous Databases", http://scholar.google.com/scholar?hl=en&lr=&q=cache:sE6pcsZOP6UJ:www.it.swin.edu.au/personal/jhan/jhanPapers/icci96.ps+transaction+commit+linear+order+conflict.

International Search Report, Application No. PCT/US2008/066144, dated Nov. 27, 2008, 10 pages.

Frigo, et al., "The Implementation of the Cilk-5 Multithread Language", Retrieved at <<http://supertech.csail.mit.edu/papers/cilk5.pdf>>, In the Proceedings of the ACM SIGPLAN '98 Conference on Programming Language Design and Implementation, vol. 33, Issue 5, May 1998, pp. 1-12.

Welc, et al., "Safe Futures for Java", Retrieved at << http://www.cs.purdue.edu/homes/suresh/papers/oopsla05.pdf>>, Proceedings of the 20th annual ACM SIGPLAN conference on Object-oriented programming, systems, languages, and applications, Oct. 16-20, 2005, pp. 439-453.

Hammond, et al., "Programming with Transactional Coherence and Consistency (TCC)", Retrieved at << http://tcc.stanford.edu/publications/tcc_asplos2004.pdf>>, Architectural Support for Programming Languages and Operating Systems, Oct. 7-13, 2004, 13 pages.

Chung, et al., "The Common Case Transactional Behavior of Multithreaded programs", High-Performance Computer Architecture, 12th International Symposium, IEEE, Feb. 2006, 12 pages.

Wolfe, M., "High Performance Compilers for Parallel Computing", Redwood City; Addison-Wesley, 1996, ISBN 0-8053-4, Chapters 5-7, 9, 11, 222 pages.

International Search Report, Application No. PCT/US2008/065362, dated Oct. 28, 2008, 11 pages.

International Search Report, Application No. PCT/US2008/065363, mailed Oct. 29, 2008, 10 pages.

International Search Report, Application No. PCT/US2007/085035, mailed Mar. 21, 2008, 11 pages.

Shavit, Nir, "Software Transactional Memory", In Proceedings of the 14th Symposium on Principles of Distributed Computing, Ottawa: ACM, 1995, 10 pages.

* cited by examiner

EXCEPTION ORDERING IN CONTENTION MANAGEMENT TO SUPPORT SPECULATIVE SEQUENTIAL SEMANTICS

CROSS-REFERENCE TO RELATED APPLICATIONS

This is a continuation-in-part application of application Ser. No. 11/601,541, filed Nov. 17, 2006, the specification of which is incorporated by reference herein in its entirety.

BACKGROUND

Computer programmers write source code for software using one of various types of programming languages. The source code is typically enclosed in one or more statements that contain the logic that is later executed by a computer. The term "statement" is used broadly herein as covering function, method, or procedure invocations, statement blocks, and/or other portions of logic that are executed by a computer. In sequential programming, source code can be written to execute statements that follow a certain sequential order. For example, statement A may be executed, followed by the execution of statement B.

Software transactional memory is a concurrency control mechanism analogous to database transactions for controlling access to shared memory in concurrent computing. A transaction in the context of transactional memory is a piece of code that "atomically" executes a series of reads and writes to shared memory. In the traditional model a set of concurrent transactions can commit in any order, but the effects of this executions are as if the transactions executed serially in this order One possible use of transactional memory is to attempt to speed up sequential programs by automatically (or semi-automatically) introducing speculative parallelism. Thus, several sequentially ordered statements can be executed speculatively, in parallel. This parallel execution may or may not be semantically equivalent to the original sequential execution—if the parallel invocations have data dependencies, where one reads from a location that the other wrote, then they may differ, while invocations without data dependencies may safely execute in parallel. Transactional memory mechanisms can be used to detect such data dependencies; each invocation executes as a transaction, and a data dependency that would require the transactions to serialize in an order other than the sequential order of the invocations causes the violating transaction to be aborted and re-executed.

One problem with taking several sequentially ordered statements and speculatively executing them in parallel is that any exceptions thrown out of speculatively executed statements that are being executed in parallel may not occur in the order that they would have in the original sequential execution. This can lead to incorrect behavior or results.

SUMMARY

Various technologies and techniques are disclosed for applying ordering to transactions in a transactional memory system. A transactional memory system is provided with a feature to allow a pre-determined commit order to be specified for a plurality of transactions. The pre-determined commit order is used at runtime to aid in determining an order in which to commit the transactions in the transactional memory system. In one implementation, the pre-determined commit order can be either total ordering or partial ordering. In the case of total ordering, the transactions are forced to commit in a linear order. In the case of partial ordering, the transactions are allowed to commit in one of multiple acceptable scenarios. In one implementation, a commit arbitrator keeps track of the next-to-commit value representing the transaction that should be allowed to commit next, and when a particular transaction is ready to commit, it is allowed to do so if its commit order number matches the next-to-commit value of the commit arbitrator.

A contention management process is invoked when a conflict occurs between a first transaction and a second transaction. The pre-determined commit order is used in the contention management process to aid in determining whether the first transaction or the second transaction should win the conflict and be allowed to proceed.

In one implementation, various technologies and techniques are disclosed for handling exceptions in a sequence of statements that are executed in parallel. A transactional memory system is provided with a contention manager. The contention manager is responsible for managing exceptions that are thrown by statements that were designed to be executed in an original sequential order, and that were transformed into commit ordered transactions for speculative execution in parallel. The contention manager ensures that any exceptions thrown by statements that are being executed speculatively in parallel are handled in the original sequential order.

Take, for example, a first statement and a second statement that are ordered in an original sequential order, with the first statement designed to execute before the second statement. Using a transactional memory system, the system creates a first transaction to execute the first statement and a second transaction to execute the second statement. These transactions are then assigned to different threads, so that they end up being executed speculatively in parallel. The system detects when at least one exception is thrown in one of the speculatively executed statements. If the first statement finished successfully, and the second statement threw an exception, then the first transaction is committed, and the second transaction is committed up to the point at which the exception was raised. If the first statement threw the exception, then the first transaction is committed up to the point at which the exception was raised, the exception is raised for the first transaction, and the second transaction is rolled back.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
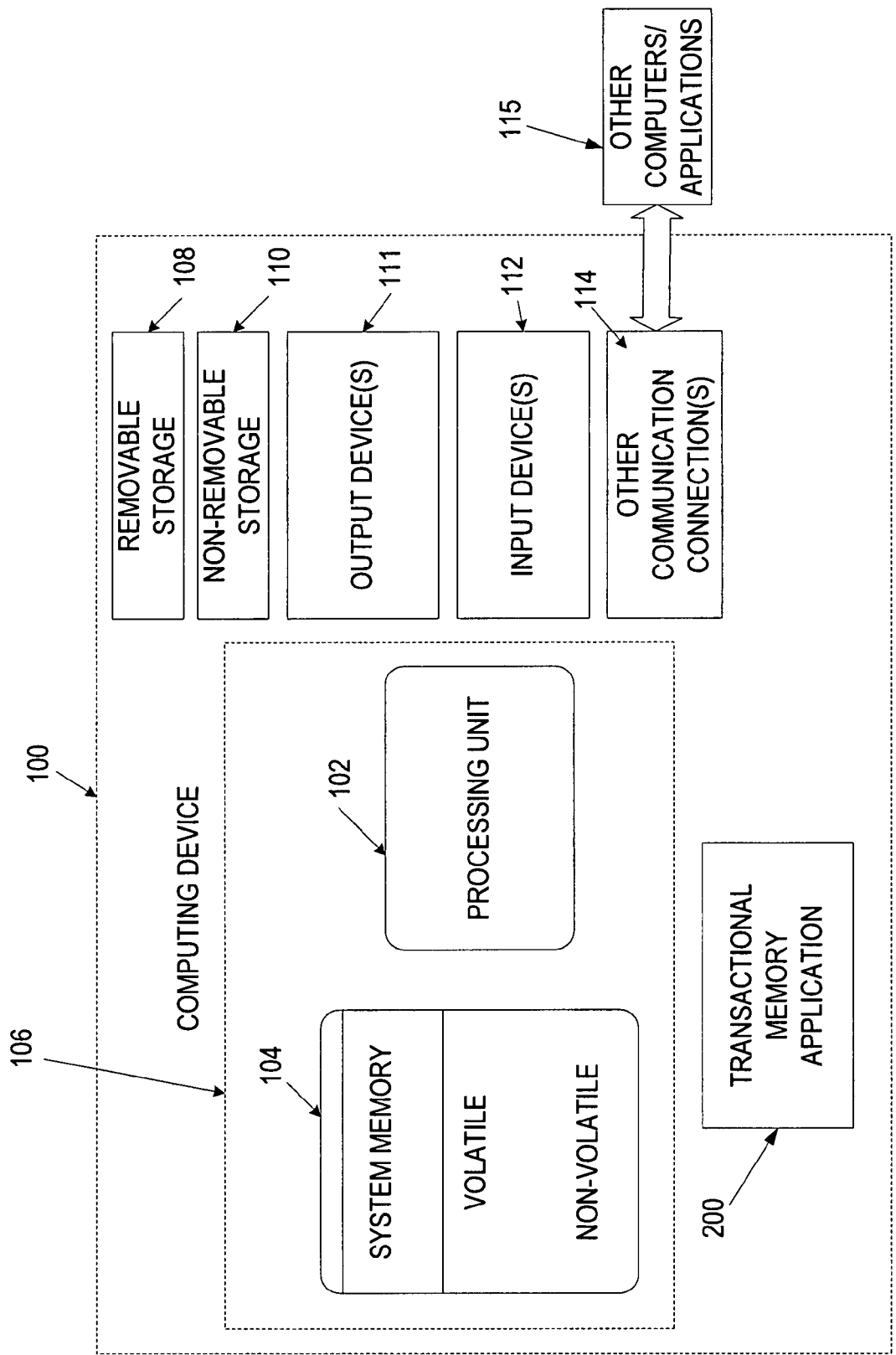
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications.

In one implementation, a feature is provided in the transactional memory system to allow a pre-determined commit order to be specified for a plurality of transactions. The pre-determined commit order is used to aid in determining an order in which to commit the transactions. In one implementation, a contention management process is invoked when a conflict occurs between a first transaction and a second transaction. The pre-determined commit order is then used in the contention management process to aid in determining whether the first transaction or the second transaction should win the conflict and be allowed to proceed.

In another implementation, one or more of the techniques described herein are implemented as features with other applications that deal with developing applications that execute in concurrent environments. A contention manager is provided that is also responsible for managing exceptions that occur within statements that were designed to be executed in an original sequential order, and that were transformed into ordered transactions for speculative execution in parallel. The contention manager ensures that any exceptions that are thrown from one or more speculatively executed blocks while the statements are being executed speculatively in parallel are handled in the original sequential order.

While many of the examples discussed herein are described in the context of a software transactional memory system, it will be appreciated that in other implementations, some, all, or additional features and/or techniques than discussed herein could be implemented with a hardware transactional memory system either separately or in conjunction with a software transactional memory system.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
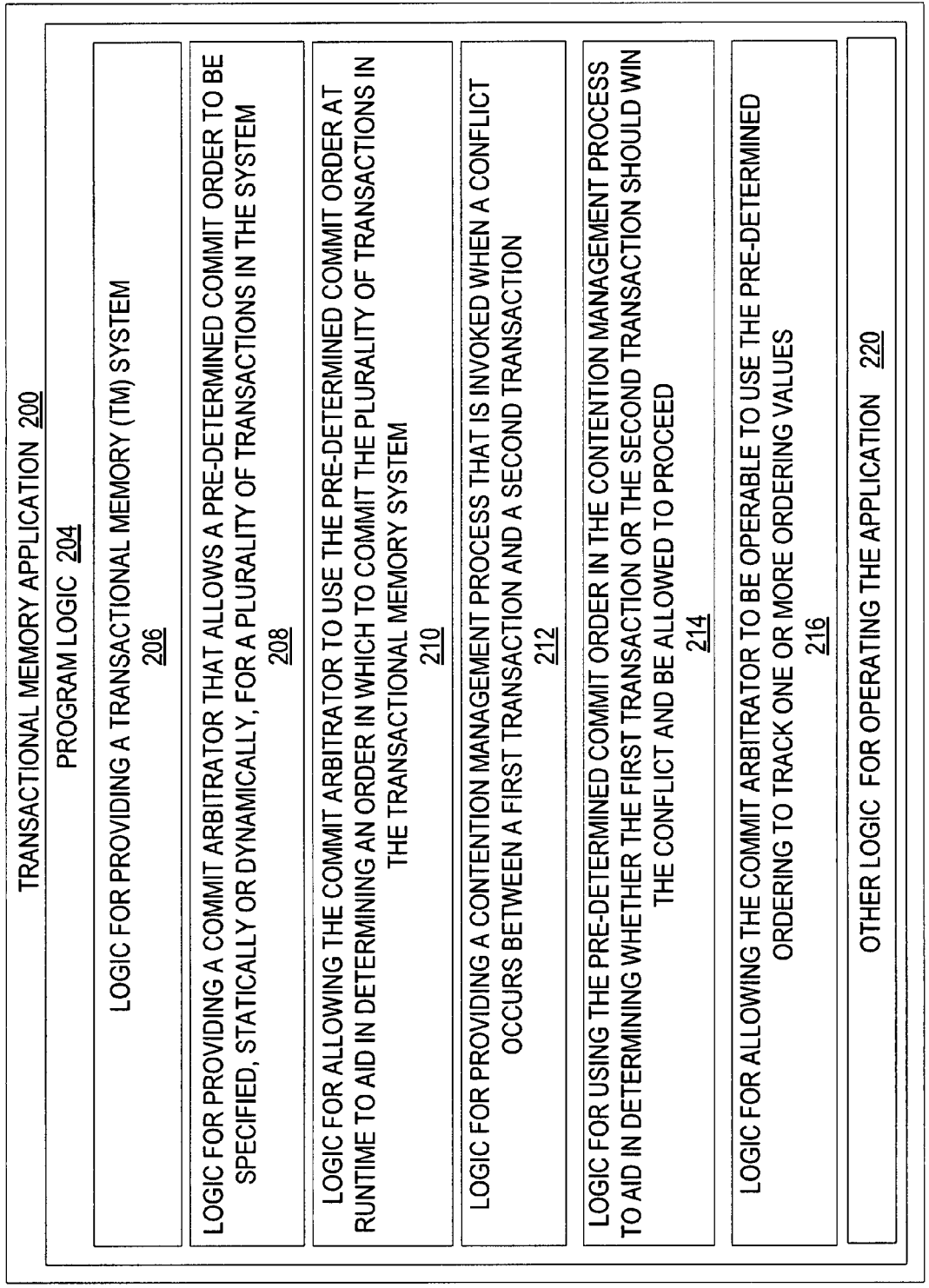
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a transactional memory (TM) system 206; logic for providing a commit arbitrator that allows a pre-determined commit order to be specified, statically or dynamically, for a plurality of transactions in the TM system 208; logic for allowing the commit arbitrator to use the pre-determined commit order at runtime to aid in determining an order in which to commit the plurality of transactions in the transactional memory system 210; logic for providing a contention management process that is invoked when a conflict occurs between a first transaction and a second transaction 212; logic for using the pre-determined commit order in the contention management process to aid in determining whether the first transaction or the second transaction should win the conflict and be allowed to proceed (e.g. depending on which one has the lower commit order number of two transaction in the same transaction group) 214; logic for allowing the commit arbitrator to be operable to use the pre-determined commit ordering to track one or more ordering values (e.g. in total ordering—a next-to-commit field that represents a next transaction of the plurality of transaction that should be allowed to commit) and for comparing the one or more ordering values to a particular commit order number of a given transaction to see if the commit of the given transaction is proper given the ordering that should be enforced) 216; and other logic for operating the application 220. In one implementation, program logic 204 is operable to be called programmatically from another program, such as using a single call to a procedure in program logic 204.

Figure 3:
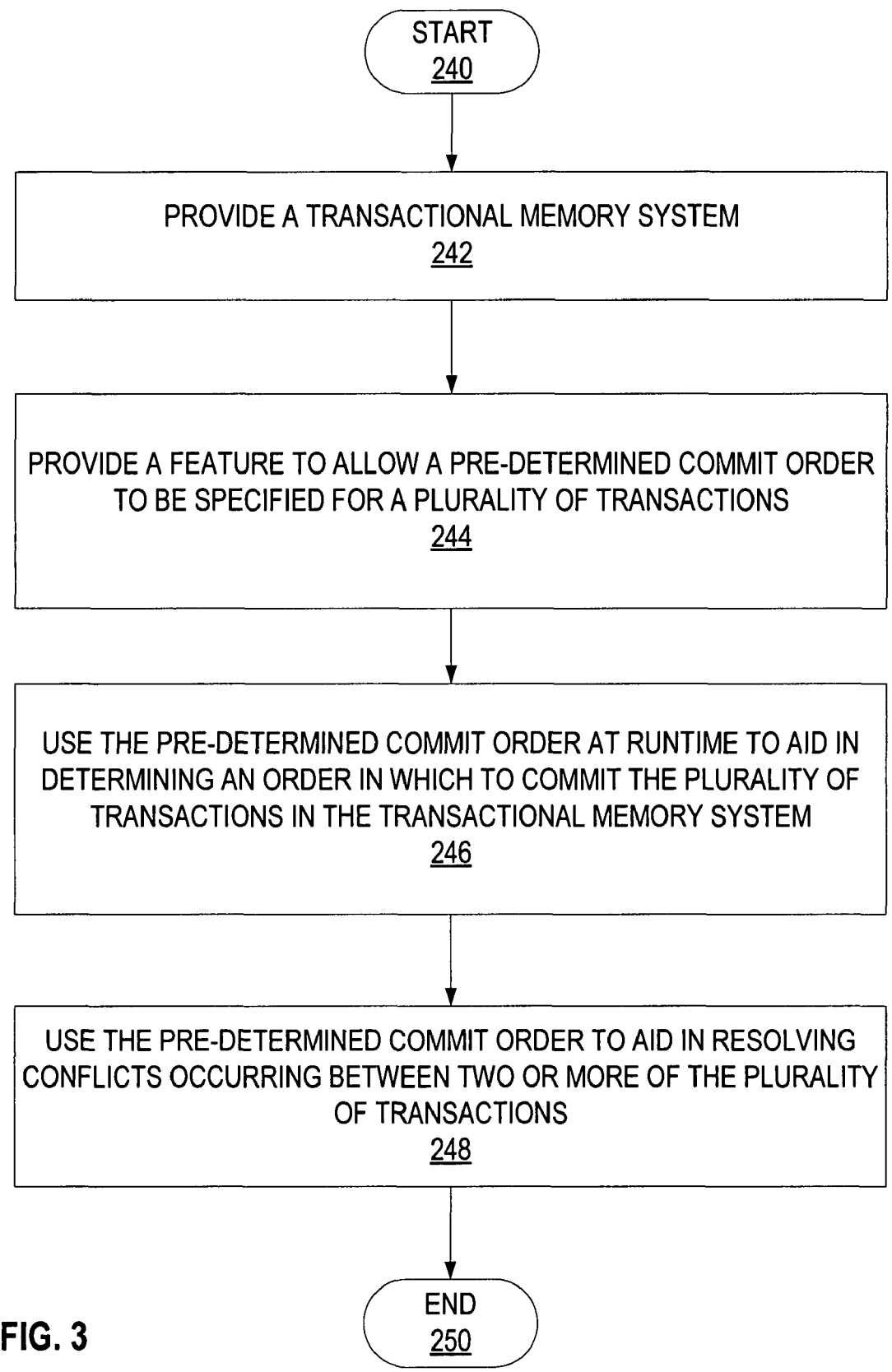
FIG. 3 is a high-level process flow diagram for one implementation of the system of FIG. 1.

Turning now to FIGS. 3-10 with continued reference to FIGS. 1-2, the stages for implementing one or more implementations of transactional memory application 200 are described in further detail. FIG. 3 is a high level process flow diagram for transactional memory application 200. In one form, the process of FIG. 3 is at least partially implemented in the operating logic of computing device 100. The procedure begins at start point 240 with providing a transactional memory system (e.g. a software transactional memory system) (stage 242). A feature is provided to allow a pre-determined commit order (e.g. a total ordering or partial ordering) to be specified for a plurality of transactions (e.g. assigned dynamically or statically) (stage 244). The term "pre-determined commit order" as used herein is meant to include a specific order in which a particular group of related transactions should be committed, as determined at any point in time before the transactions start running. The term "group" of transactions as used herein includes a particular set of (e.g. plurality of) transactions managed by the same commit arbitrator, as well as nested children of those transactions.

The pre-determined commit order is used at runtime to aid in determining an order in which to commit the plurality of transactions in the transactional memory system (stage 246). The pre-determined commit order is used to aid in resolving conflicts occurring between two or more of the plurality of transactions (stage 248). The process ends at end point 250.

Figure 4:
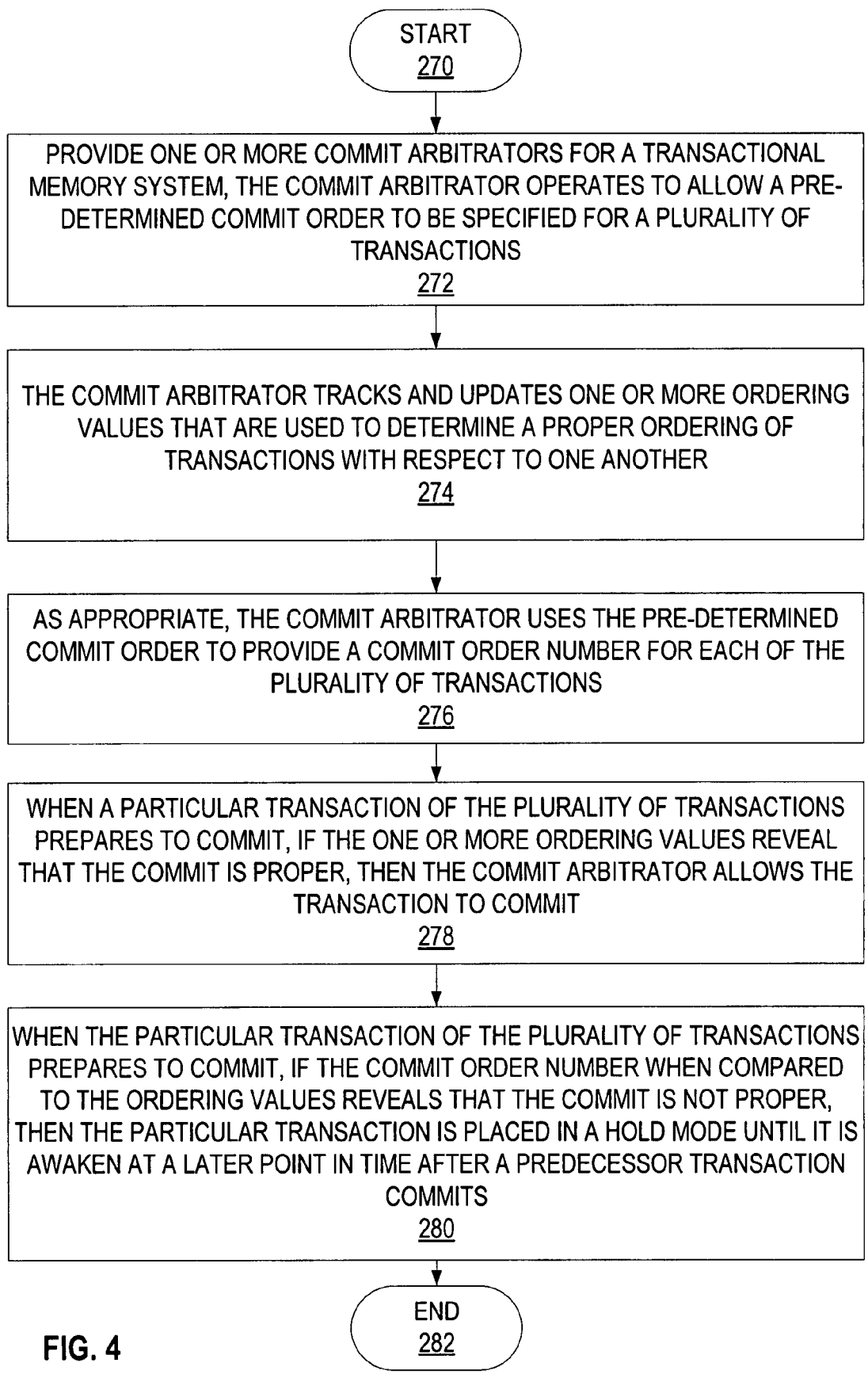
FIG. 4 is a process flow diagram for one implementation of the system of FIG. 1 illustrating the stages involved in using a commit arbitrator to enforce a pre-determined commit order.

FIG. 4 illustrates one implementation of the stages involved in using a commit arbitrator to enforce a pre-determined commit order. In one form, the process of FIG. 4 is at least partially implemented in the operating logic of computing device 100. The procedure begins at start point 270 with providing one or more commit arbitrators for a transaction memory system, the commit arbitrator being operable to allow a pre-determined commit order to be specified for a plurality of transactions (stage 272). The term "commit arbitrator" as used herein is meant to include any type of program, feature, or process that is responsible for managing one or more groups of transactions that should be ordered with respect to one another. In one implementation, there can be one or more commit arbitrators active within a program at any given time. For example, as many commit arbitrators as are needed can be created to manage the different groups of transactions. The commit arbitrator tracks and updates one or more ordering values that are used to determine the proper ordering of transactions with respect to one another (stage 274). In the case of total ordering, a next-to-commit field can be used to represent a next transaction of a plurality of transactions that should be committed next) (stage 274). In the case of partial ordering, a directed graph of different possible orders is tracked using the ordering values. As appropriate, the commit arbitrator uses the pre-determined commit order to provide a commit order number for each of the plurality of transactions (stage 276).

When a particular transaction of the plurality of transactions prepares to commit, if the commit order number for the particular transaction when compared to the one or more ordering values reveals that the commit is proper, then the commit arbitrator allows the transaction to commit (stage 278). In the case of total ordering, this scenario occurs when the next-to-commit field and the commit order number for the particular transaction have the same value. In such a scenario, the commit arbitrator allows the transaction to commit and then increments the next-to-commit field to a next number in a sequence (e.g. next higher number) if the commit is successful (stage 278). When the particular transaction of the plurality of transactions prepares to commit, if the commit order number for the particular transaction when compared to the ordering values reveals that the commit is not proper, then the particular transaction is placed in a hold mode until it is awakened at a later point in time after a predecessor transaction commits (stage 280). In the case of total ordering, this hold mode is entered when the next-to-commit field and the order number for the particular transaction do not have the same value.

In one implementation, the system may wake a transaction after its immediate predecessor has committed, in which case it may try to commit right away. Alternatively, the system may choose to wake a transaction after some non-immediate predecessor has committed, even though its immediate predecessor may not yet have committed. After being awakened, the system checks to see if it is appropriate for the transaction to really commit. If so, the transaction is committed. The process ends at end point 282.

Figure 5:
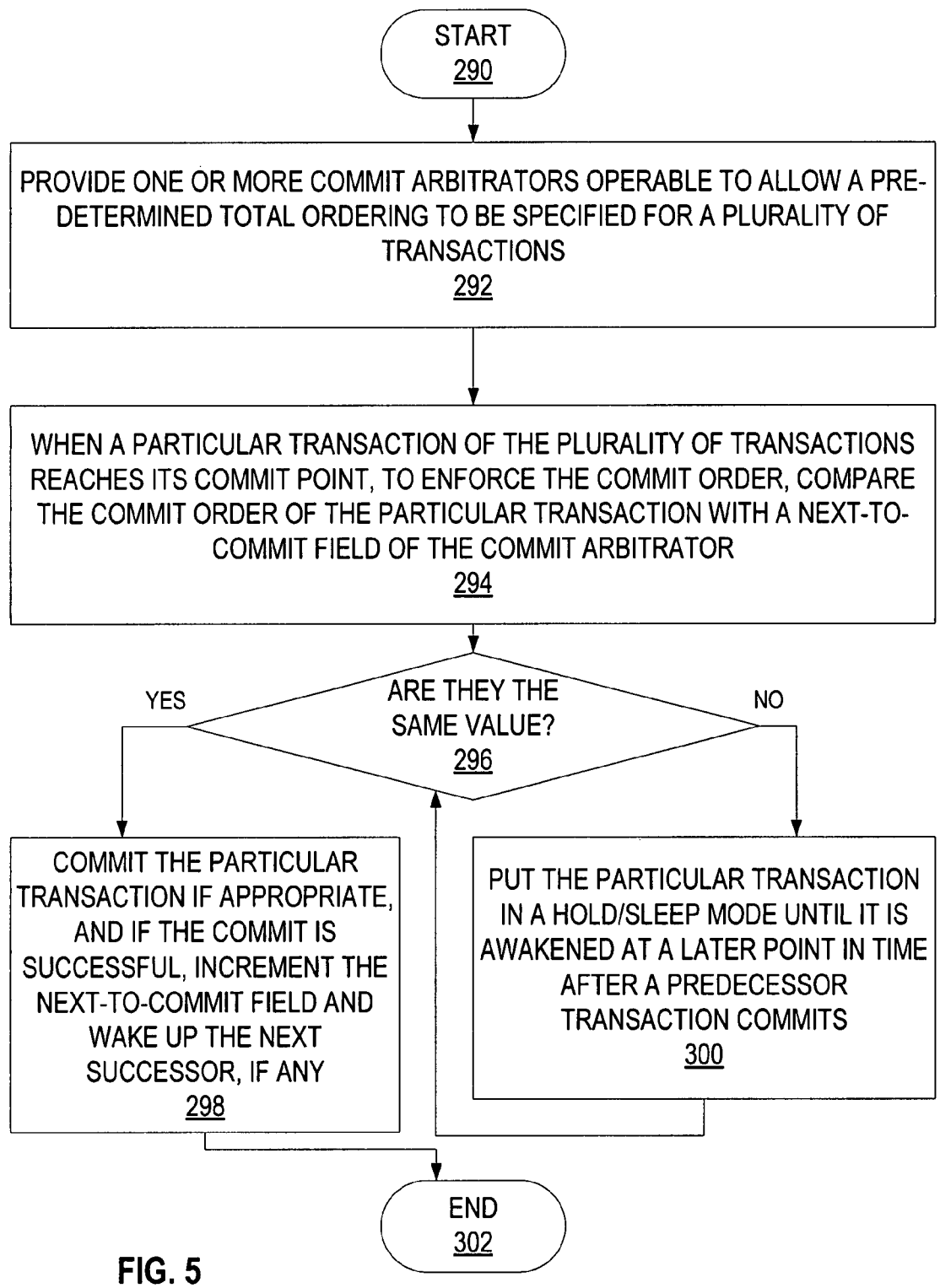
FIG. 5 is a process flow diagram for one implementation of the system of FIG. 1 illustrating the stages involved in using a commit arbitrator to enforce a total ordering of a plurality of transactions.

FIG. 5 illustrates one implementation of the stages involved in using a commit arbitrator to enforce a total ordering of a plurality of transactions. In one form, the process of FIG. 5 is at least partially implemented in the operating logic of computing device 100. The procedure begins at start point 290 with providing one or more commit arbitrators operable to allow a pre-determined total ordering to be specified for a plurality of transactions (e.g. one specifying an exact order in which the plurality of transactions should be committed) (stage 292). When a particular transaction of the plurality of transactions reaches its commit point, to enforce the commit order, the commit order of the particular transaction is compared with a next-to-commit field of the commit arbitrator (stage 296). In one implementation, if the system determines that enforcement of the total ordering is not necessary (e.g. such as because there is definitely no conflict), then the total ordering requirement can be broken as appropriate (stage 294), then the process ends at end point 302.

If commit ordering is to be enforced, and if the commit order of the particular transaction has a same value as the next-to-commit field of the commit arbitrator (decision point 296), then the particular transaction is committed, and if the commit is successful, the next-to-commit field is incremented and the next successor is awakened, if any exist (stage 298). If the commit order of the particular transaction does not have the same value as the next-to-commit field of the commit arbitrator (decision point 296), then the particular transaction is put in a hold/sleep mode until it is awakened at a later point in time after a predecessor transaction commits (stage 300). In one implementation, at that later point in time, if a conflict occurs with a predecessor, that particular transaction may be asked to abort and rollback such that a predecessor may make forward progress. Otherwise, if no such conflict has occurred, that particular transaction should be able to commit once the commit order requirements described herein are met. The process then ends at end point 302.

Figure 6:
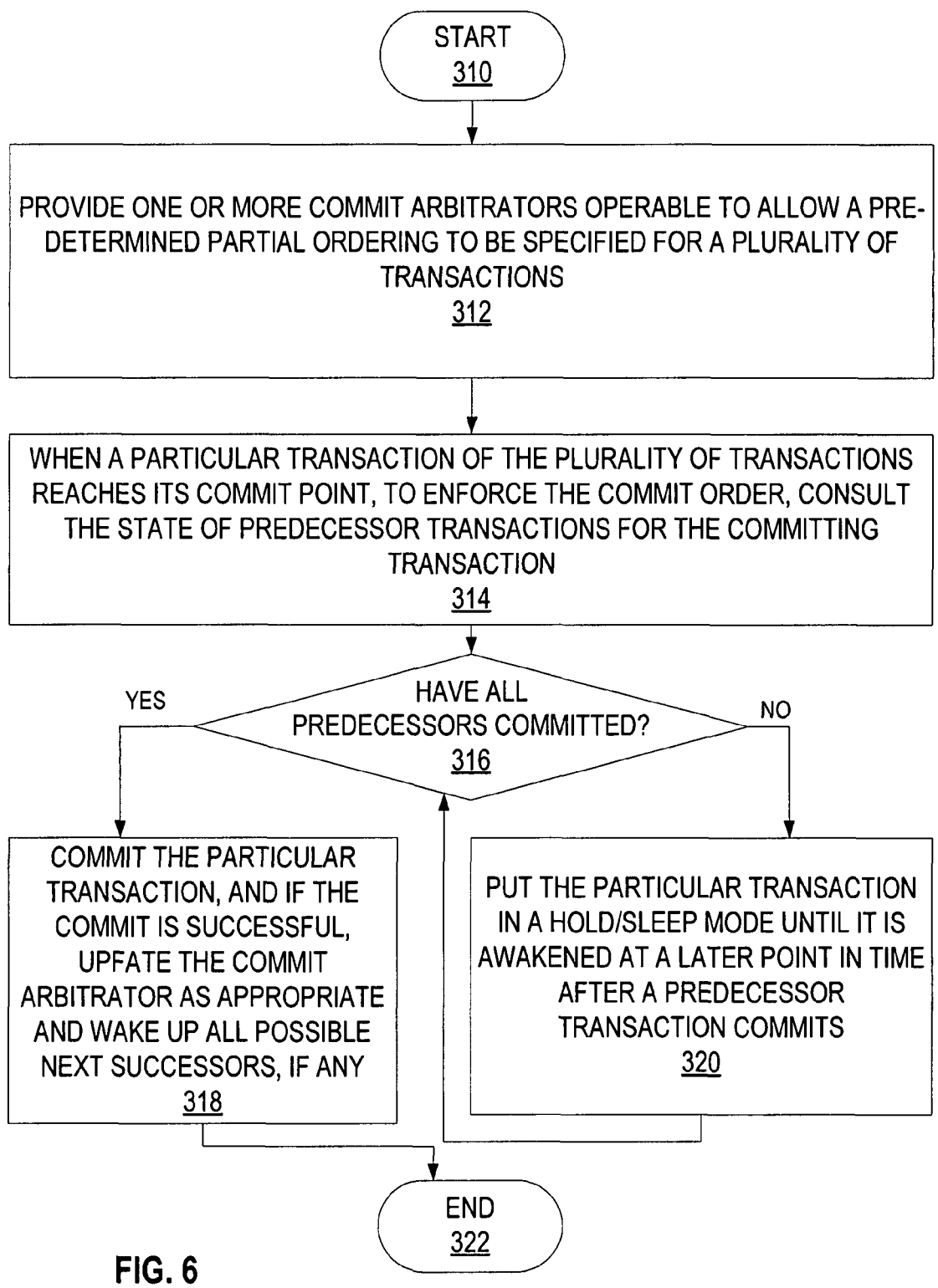
FIG. 6 is a process flow diagram for one implementation of the system of FIG. 1 illustrating the stages involved in using a commit arbitrator to enforce a partial ordering of a plurality of transactions.

FIG. 6 illustrates one implementation of the stages involved in using a commit arbitrator to enforce a partial ordering of a plurality of transactions. In one form, the process of FIG. 6 is at least partially implemented in the operating logic of computing device 100. The procedure begins at start point 310 with providing one or more commit arbitrators operable to allow a pre-determined partial ordering to be specified for a plurality of transactions (e.g. one specifying a plurality of acceptable orders in which the plurality of transactions should be committed—e.g. in the form of a directed graph) (stage 312). When a particular transaction of the plurality of transactions reaches its commit point, to enforce the commit order, the state of the predecessor transactions (e.g. one or more ordering values) are consulted for the particular committing transaction (e.g. as tracked by the commit arbitrator) (stage 314). If all predecessors to the particular transaction have committed (decision point 316), then the particular transaction is committed (stage 318). If the commit is successful, one or more values tracked by the commit arbitrator are updated as appropriate, and all possible next successors are awakened, if any exist (stage 318).

If all predecessors to the particular transaction have not committed (decision point 316), then the particular transaction is put in a hold/sleep mode until it is awakened at a later point in time after a predecessor transaction commits (stage 320). The process ends at end point 322.

Figure 7:
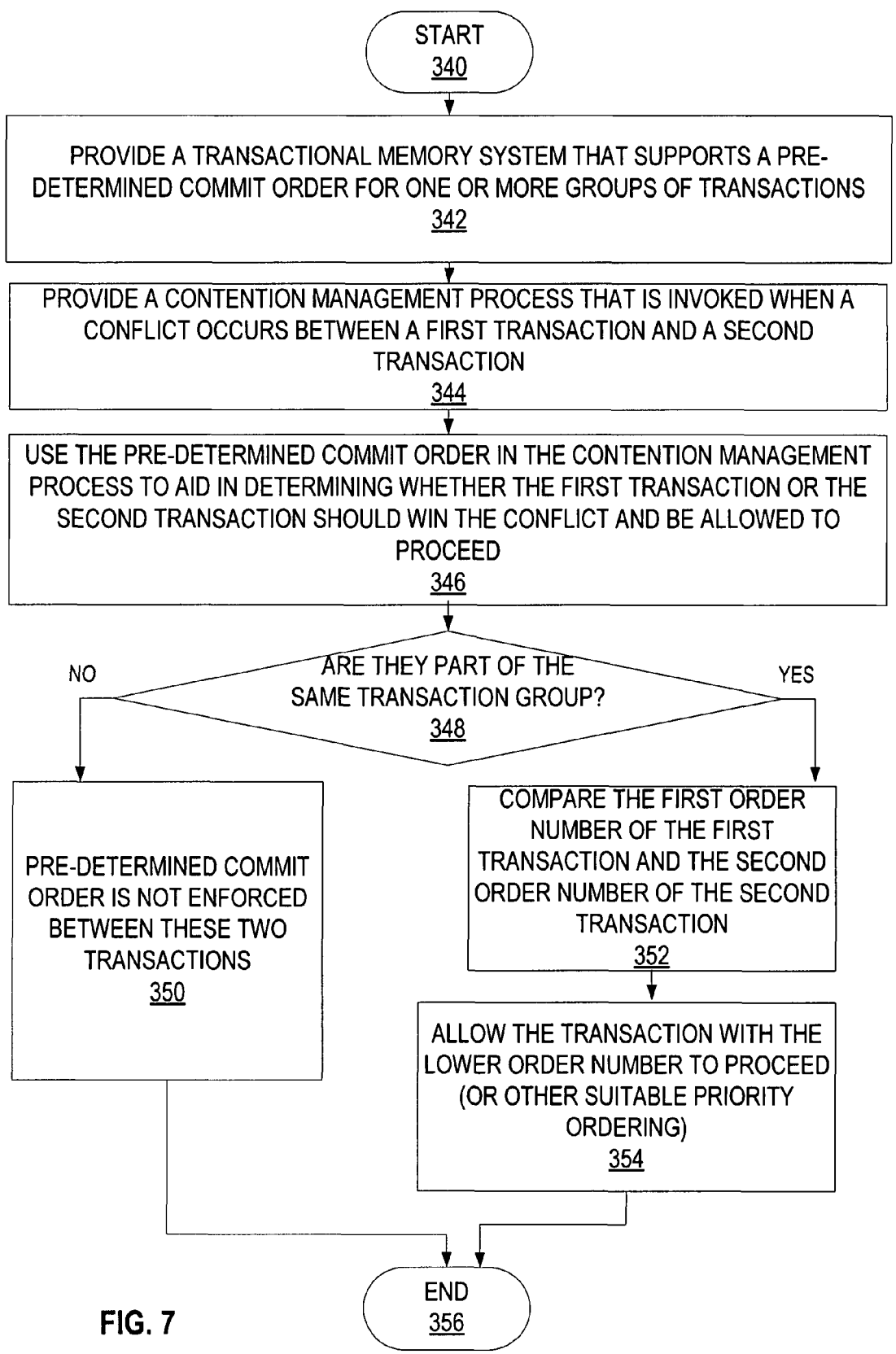
FIG. 7 is a process flow for one implementation of the system of FIG. 1 that illustrates the stages involved in providing a contention management process that manages conflicts using the pre-determined commit order information.

FIG. 7 illustrates one implementation of the stages involved in providing a contention management process that manages conflicts using the pre-determined commit order information. In one form, the process of FIG. 7 is at least partially implemented in the operating logic of computing device 100. The procedure begins at start point 340 with providing a transactional memory system that supports a pre-determined commit order for one or more groups of transactions (stage 342). A contention management process is provided that is invoked when a conflict occurs between a first transaction and a second transaction (stage 344). The pre-determined commit order is used in the contention management process to aid in determining whether the first transaction or the second transaction should win the conflict and be allowed to proceed (stage 346). If the first transaction and second transaction are not part of the same transaction group (decision point 348), then a pre-determined commit order is not enforced between these two transactions (because none existed) (stage 350). In such a scenario, since the two transactions are not in a same transaction group, the ordering factor is not used to help resolve the conflict (stage 350).

If the first transaction and the second transaction are part of the same transaction group (decision point 348), then the system compares the first order number of the first transaction and the second order number of the second transaction (stage 352). The transaction with the lower order number is allowed to proceed (or with another suitable priority ordering) (stage 354). The process ends at end point 356.

Figure 8:
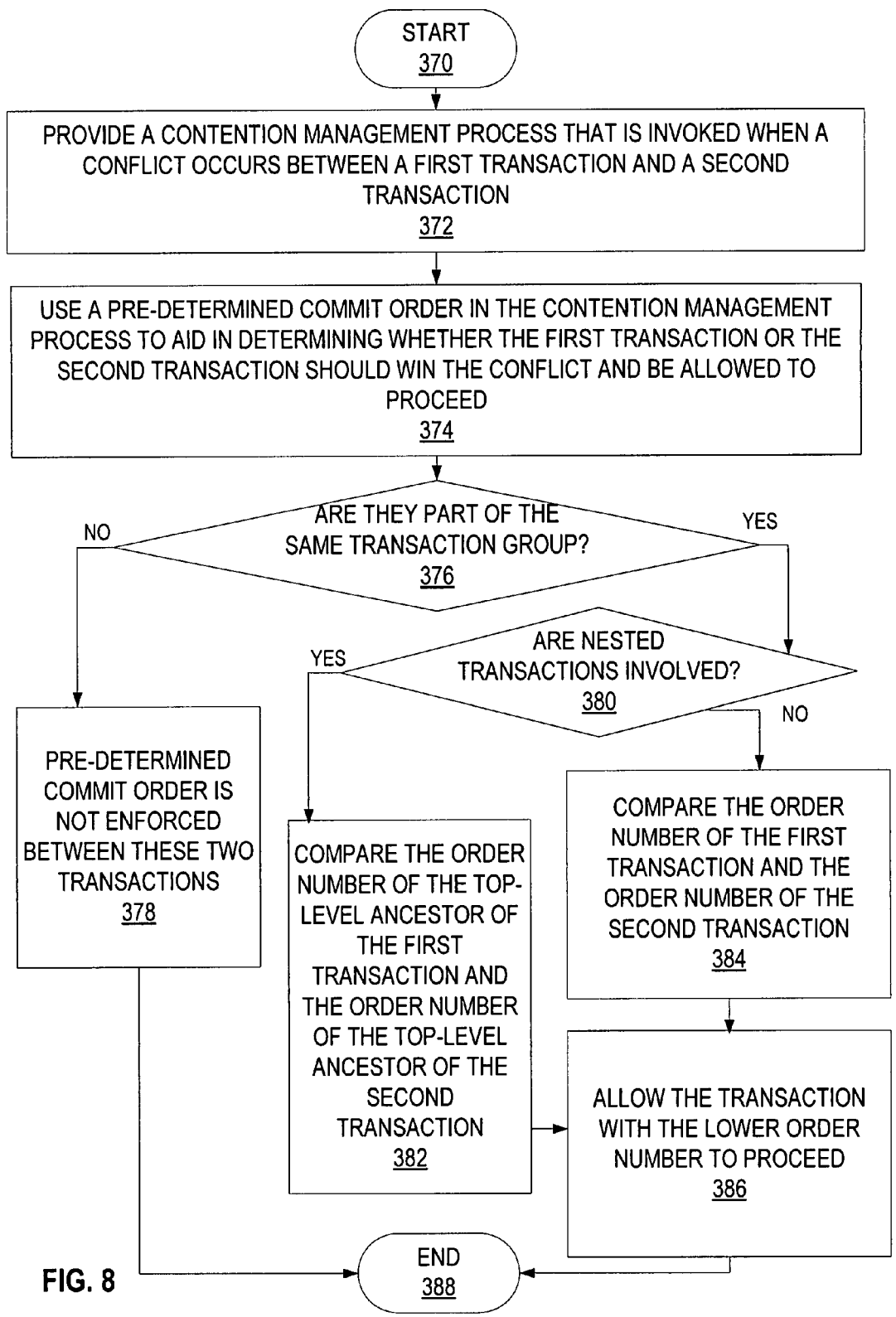
FIG. 8 is a process flow for one implementation of the system of FIG. 1 that illustrates the stages involved in providing a contention management process that manages conflicts with nested transactions using the pre-determined commit order information.

FIG. 8 illustrates one implementation of the stages involved in providing a contention management process that manages conflicts with nested transactions using the pre-determined commit order information. In one form, the process of FIG. 8 is at least partially implemented in the operating logic of computing device 100. In one implementation, the entire ancestor chain is considered for each transaction before committing the particular transaction, so that any ordering present in that chain is enforced. The procedure begins at start point 370 with providing a contention management process that is invoked when a conflict occurs between a first transaction and a second transaction (stage 372). A pre-determined commit order is used in the contention management process to aid in determining whether the first transaction or the second transaction should win the conflict and be allowed to proceed (stage 372). If the first and second transactions are not part of the same transaction group (decision point 376), then a pre-determined commit order is not enforced between those two transactions (because none existed) (stage 378) and the process ends at end point 388. If the first and second transactions are part of the same transaction group (decision point 376), then the system checks to see if nested transactions are involved (decision point 380).

If nested transactions are not involved (decision point 380), then the order number (or other ordering indicator) of the first transaction is compared with the order number (or other ordering indicator) of the second transaction (stage 384). The transaction with the lower order number is allowed to proceed (or the one determined to be next in order by using other suitable ordering criteria) (stage 386).

If nested transactions are involved (decision point 380), then the order number (or other ordering indicator) of the top level ancestor of the first transaction is compared with the order number (or other ordering indicator) of the top level ancestor of the second transaction (stage 382). The term "top level ancestor" as used herein is meant to include the immediate children of common ancestors where common ancestors are involved and the top level ancestor of each transaction where there is no common ancestor involved. These scenarios involving common and uncommon ancestors are illustrated in further detail in FIGS. 9 and 10. The transaction with the lower order number is allowed to proceed (e.g. the transaction related to the ancestor that had the lower order number or other suitable criteria) (stage 386). The process ends at end point 388.

Figure 9:
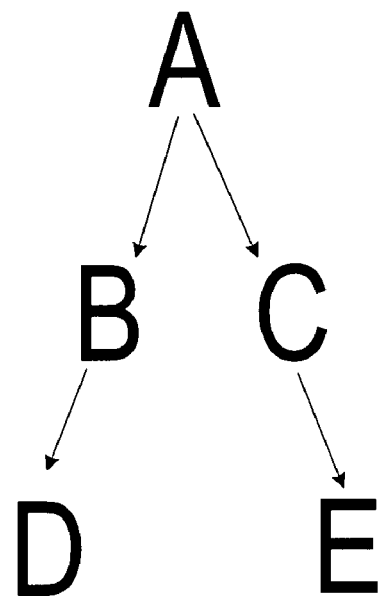
FIG. 9 is a logical diagram illustrating an exemplary ancestor tree with top level ancestors that have a common ancestor.

FIG. 9 is a logical diagram illustrating an exemplary ancestor tree with top level ancestors that have a common ancestor. In the example shown, transaction A is a common ancestor of D and E. In conflicts occurring between D and E, the order number of transactions B and C (the immediate children of common ancestor A) are analyzed to determine which transaction D or E should be allowed to proceed (stage 382 in FIG. 8).

Figure 10:
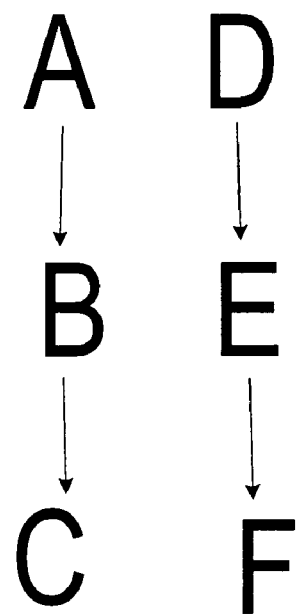
FIG. 10 is a logical diagram illustrating an exemplary ancestor tree with top level ancestors that do not have a common ancestor.

FIG. 10 is a logical diagram illustrating an exemplary ancestor tree with top level ancestors that do not have common ancestors. In the example shown, transaction A is an ancestor of transaction C. Transaction D is an ancestor of transaction F. In conflicts occurring between transactions C and F, then the order number of transactions A and D (the top level ancestor of each) are compared to determine which transaction C or F should be allowed to proceed (stage 382 in FIG. 8).

Figure 11:
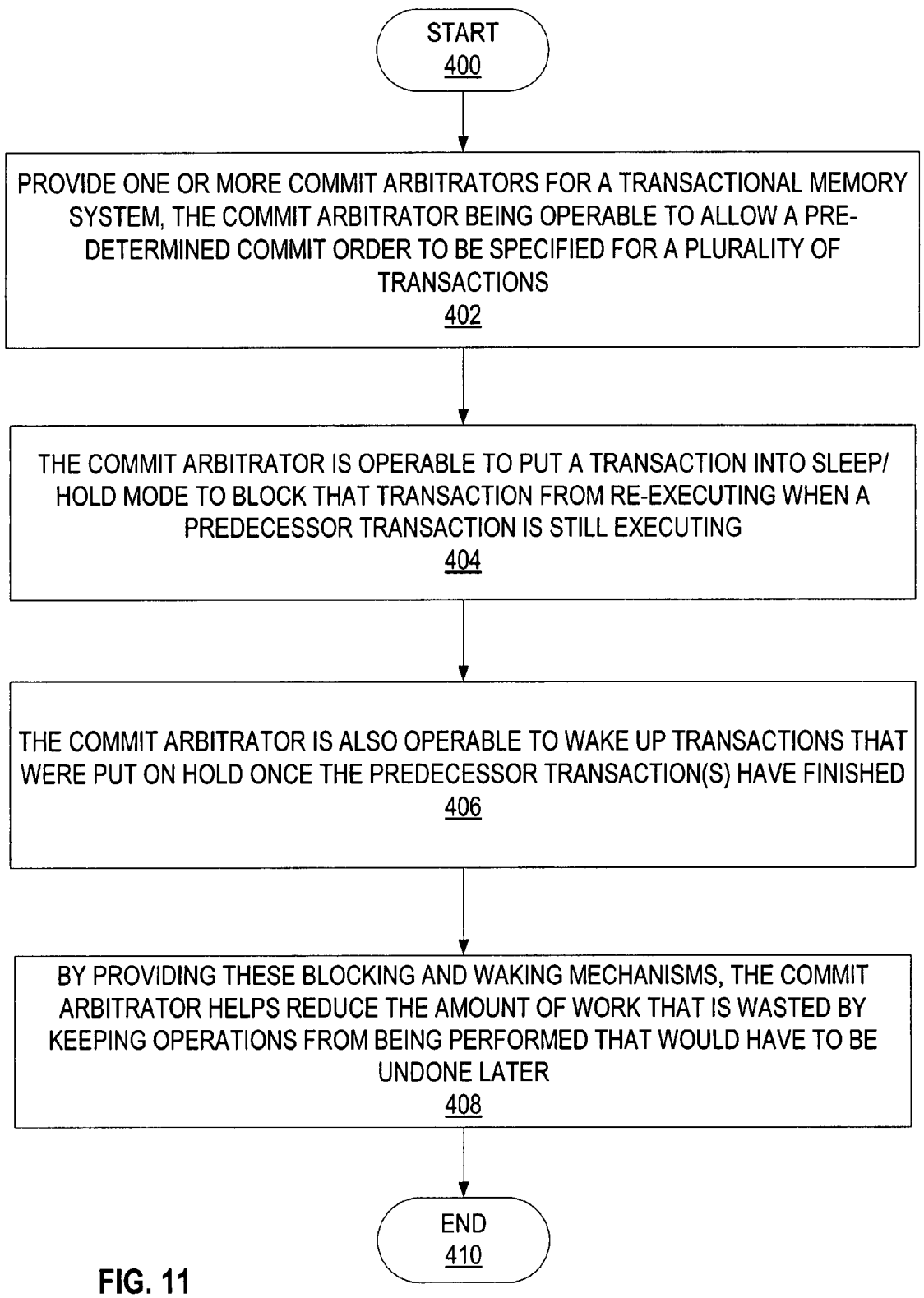
FIG. 11 is a process flow diagram for one implementation of the system of FIG. 1 that illustrates the stages involved in reducing an amount of wasted work by using a commit arbitrator in a transactional memory system.

FIG. 11 illustrates one implementation of the stages involved in reducing the amount of wasted work by using a commit arbitrator in a transactional memory system. In one form, the process of FIG. 11 is at least partially implemented in the operating logic of computing device 100. The procedure begins at start point 400 with providing one or more commit arbitrators for a transactional memory system, the commit arbitrator being operable to allow a pre-determined commit order to be specified for a plurality of transactions (stage 402). The commit arbitrator is operable to put a transaction into sleep/hold mode to block that transaction from re-executing when a predecessor transaction is still executing (e.g. by analyzing the pre-determined commit order to determine the proper order (stage 404). The commit arbitrator is also operable to wake up transactions that were put on hold once the predecessor transaction(s) have finished (e.g. by again analyzing the pre-determined commit order to determine the proper order) (stage 406). By providing these blocking and waking mechanisms, the commit arbitrator helps reduce the amount of work that is wasted by keeping operations from being performed that would have to be undone later (stage 408). The process ends at end point 410.

Figure 12:
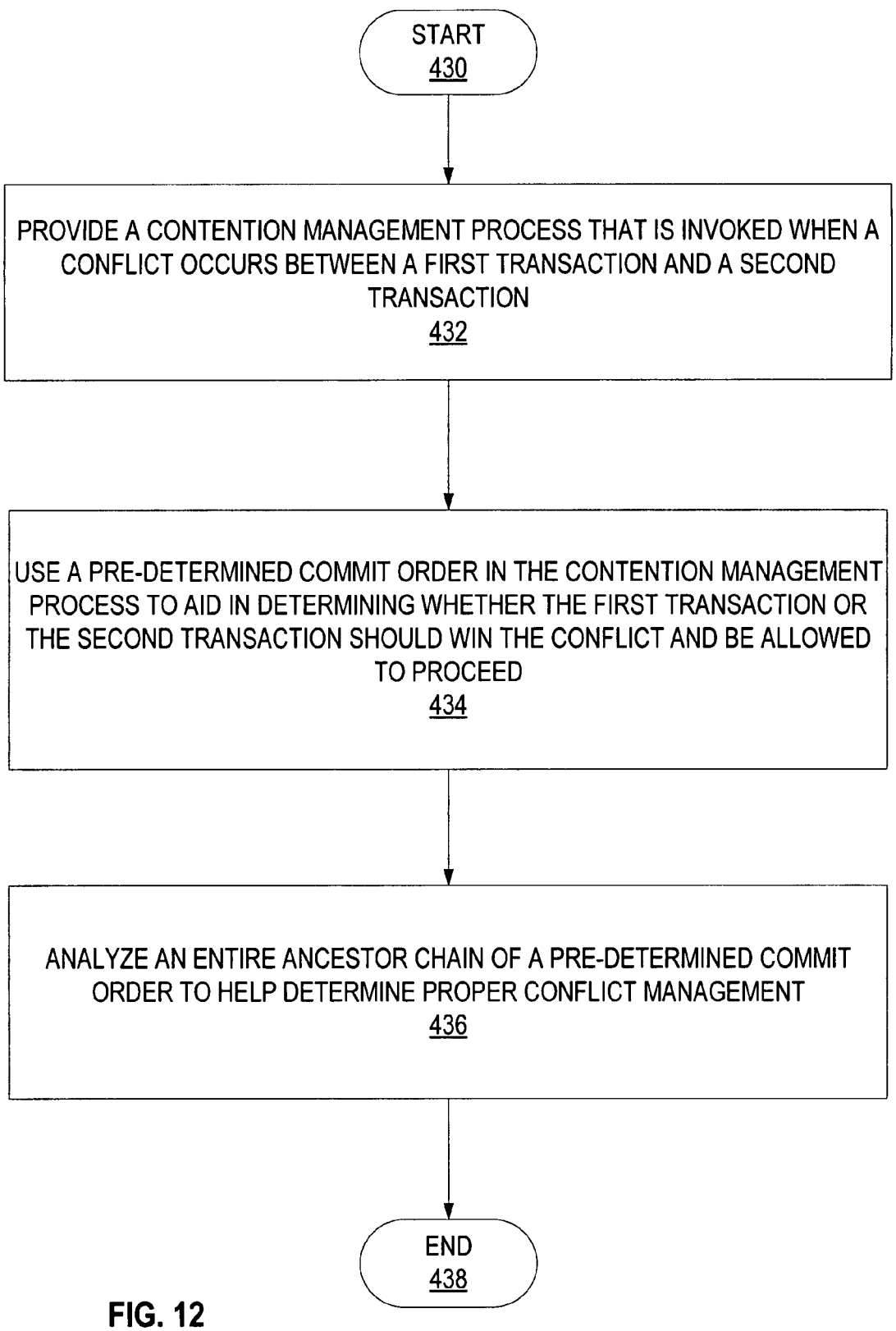
FIG. 12 is a process flow diagram for one implementation of the system of FIG. 1 that illustrates the stages involved in analyzing an entire ancestor chain in a contention management process to determine the proper conflict resolution.

FIG. 12 illustrates one implementation of the stages involved in analyzing an entire ancestor chain in a contention management process to determine the proper conflict resolution. In one form, the process of FIG. 12 is at least partially implemented in the operating logic of computing device 100. The procedure begins at start point 430 with providing a contention management process that is invoked when a conflict occurs between a first transaction and a second transaction (stage 432). A pre-determined commit order is used in the contention management process to aid in determining whether the first transaction or the second transaction should win the conflict and be allowed to proceed (stage 434). An entire ancestor chain of a pre-determined commit order is analyzed to help determine the proper conflict management (stage 436). For example, if there are four transactions, two parents and two children, where B is nested within A and D is nested within C. Suppose there is an ordering relationship between A and C where A should commit before C. If B and D conflict, the contention management process should favor B because favoring D is useless given that A must commit before C. (stage 436). The process ends at end point 438.

Figure 13:
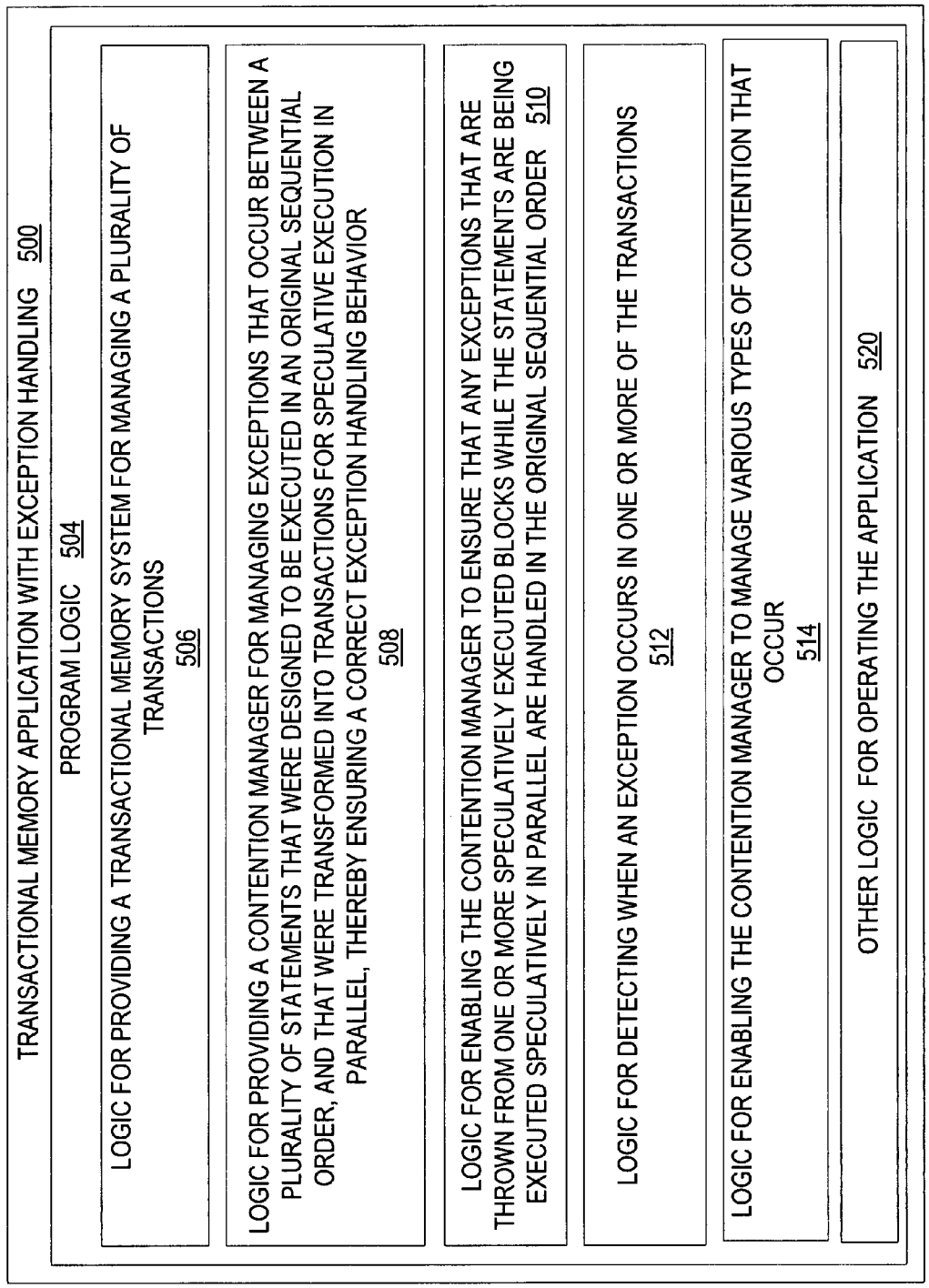
FIG. 13 is a diagrammatic view of a transactional memory application of one implementation operating on the computer system of FIG. 1.

Turning now to FIG. 13 with continued reference to FIG. 1, a transactional memory application with exception handling, running speculatively in parallel 500 operating on computing device 100 is illustrated. Transactional memory application with exception handling 500 is one of the application programs that reside on computing device 100. However, it will be understood that transactional memory application with exception handling 500 can alternatively or additionally be embodied as computer-executable instructions on one or more computers and/or in different variations than shown on FIG. 1. Alternatively or additionally, one or more parts of transactional memory application with exception handling 500 can be part of system memory 104, on other computers and/or applications 115, or other such variations as would occur to one in the computer software art.

Transactional memory application with exception handling 500 includes program logic 504, which is responsible for carrying out some or all of the techniques described herein. Program logic 504 includes logic for providing a transactional memory system for managing a plurality of transactions 506; logic for providing a contention manager for managing exceptions that occur between a plurality of statements that were designed to be executed in an original sequential order, and that were transformed into commit ordered transactions for speculative execution in parallel, thereby ensuring a correct exception handling behavior 508; logic for enabling the contention manager to ensure that any exceptions that are thrown from speculatively executed blocks while the statements are being executed speculatively in parallel are handled in the original sequential order 510; logic for detecting when an exception occurs in one or more of the transactions 512; logic for enabling the contention manager to manage various types of contention that occur 514; and other logic for operating the application 520. In one implementation, program logic 504 is operable to be called programmatically from another program, such as using a single call to a procedure in program logic 504.

Figure 14:
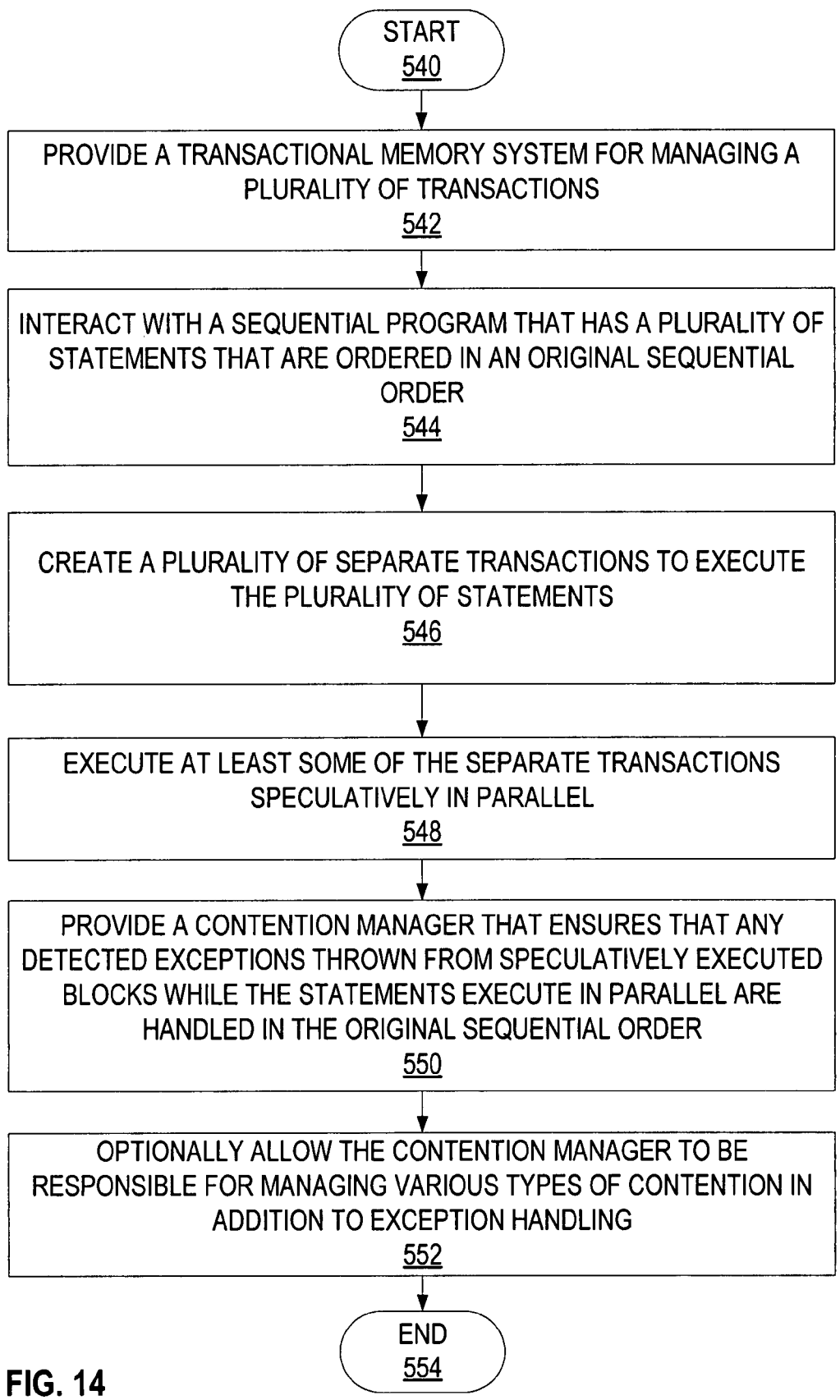
FIG. 14 is a high-level process flow diagram for one implementation of the system of FIG. 1.

Turning now to FIGS. 14-17, the stages for implementing one or more implementations of transactional memory application with exception handling 500 are described in further detail. FIG. 14 is a high level process flow diagram for transactional memory application with exception handling 500. In one form, the process of FIG. 14 is at least partially implemented in the operating logic of computing device 100. The process begins at start point 540 with providing a transactional memory system for managing a plurality of transactions (stage 542). The system interacts with a sequential program that has a plurality of statements that are ordered in an original sequential order (e.g. with a first statement designed to execute before a second statement, etc.) (stage 544). The system creates a plurality of separate transactions to execute the plurality of statements (e.g. a first transaction to execute the first statement and a second transaction to execute the second statement, and so on) (stage 546). At least some of the separate transactions are executed speculatively in parallel, such as by assigning them to different threads (stage 548). A contention manager is provided that ensures that any detected exceptions that are thrown from speculatively executed statements while the statements execute in parallel are handled in the original sequential order (stage 550). The system optionally allows the contention manager to be responsible for managing various types of contention in addition to exception handling (stage 552). For example, the system can respond to contention manager actions to rollback and re-execute a transaction even if the transaction is being held with a pending exception. The process ends at end point 554.

Figure 15:
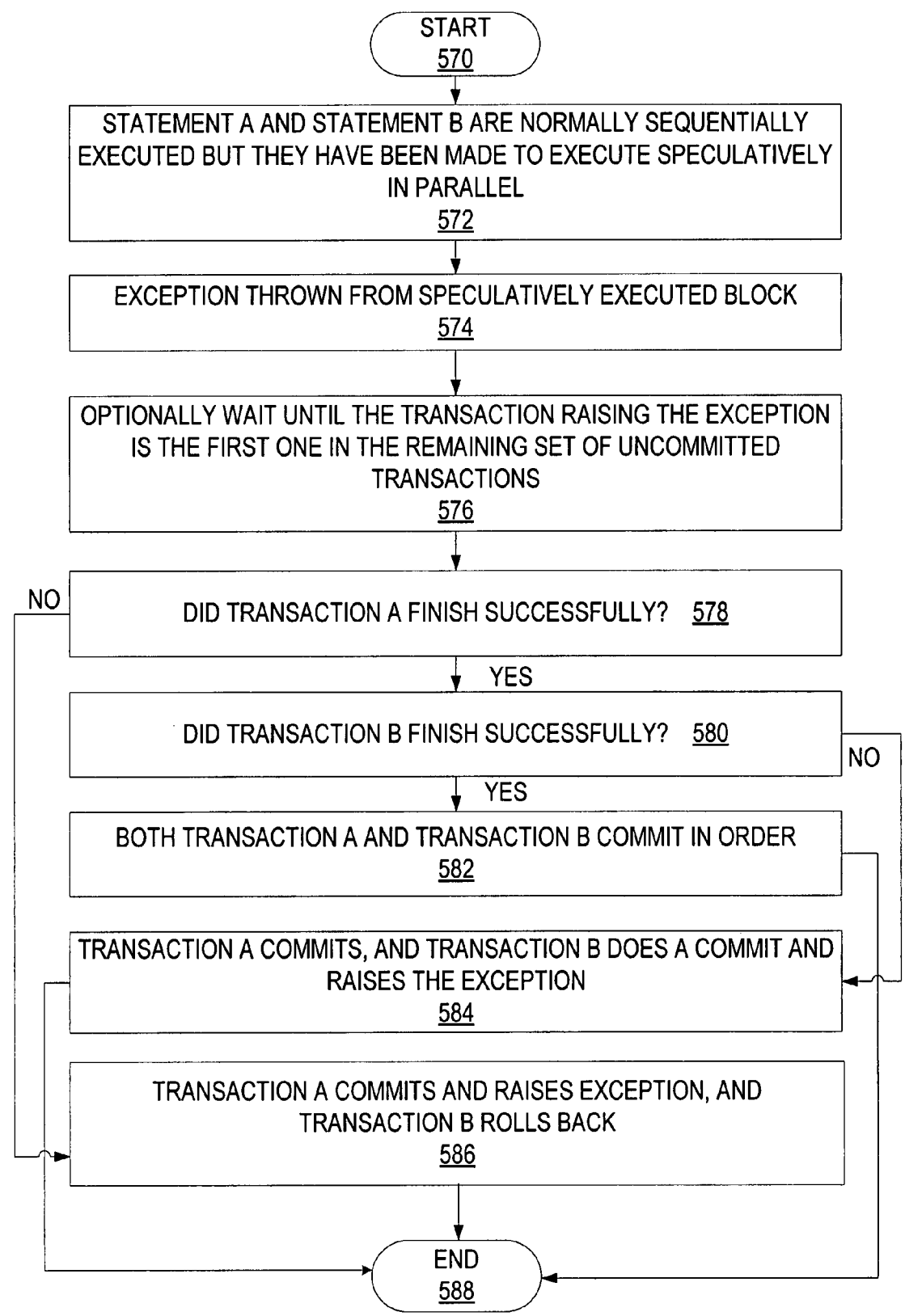
FIG. 15 is a process flow diagram for one implementation of the system of FIG. 1 illustrating the stages involved in providing a contention manager that ensures exceptions that occur in parallel executing transactions are handled in a correct order.
Figure 16:
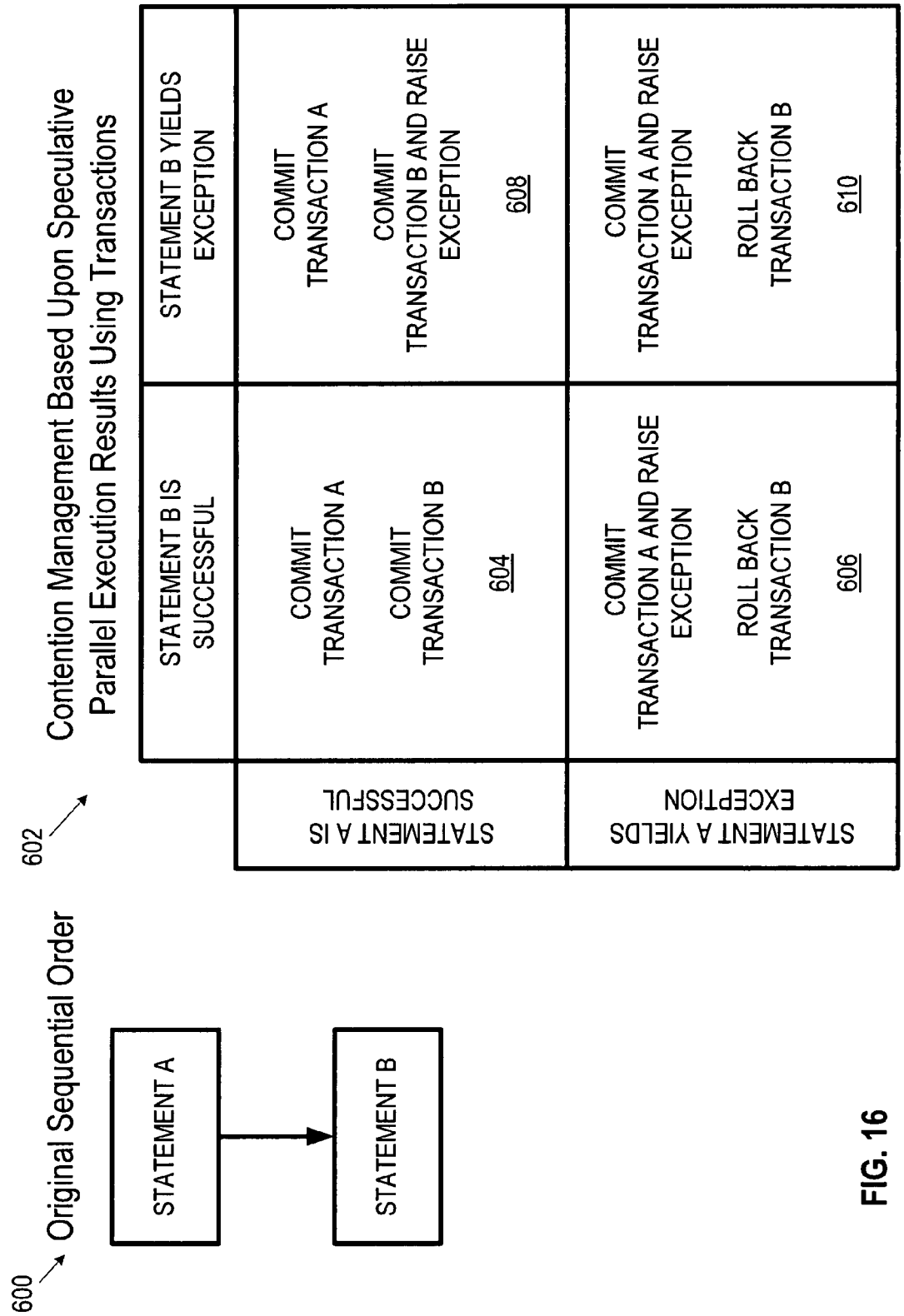
FIG. 16 is a logical diagram that illustrates a diagrammatic view of the actions for handling exceptions as described in FIG. 15.
Figure 17:
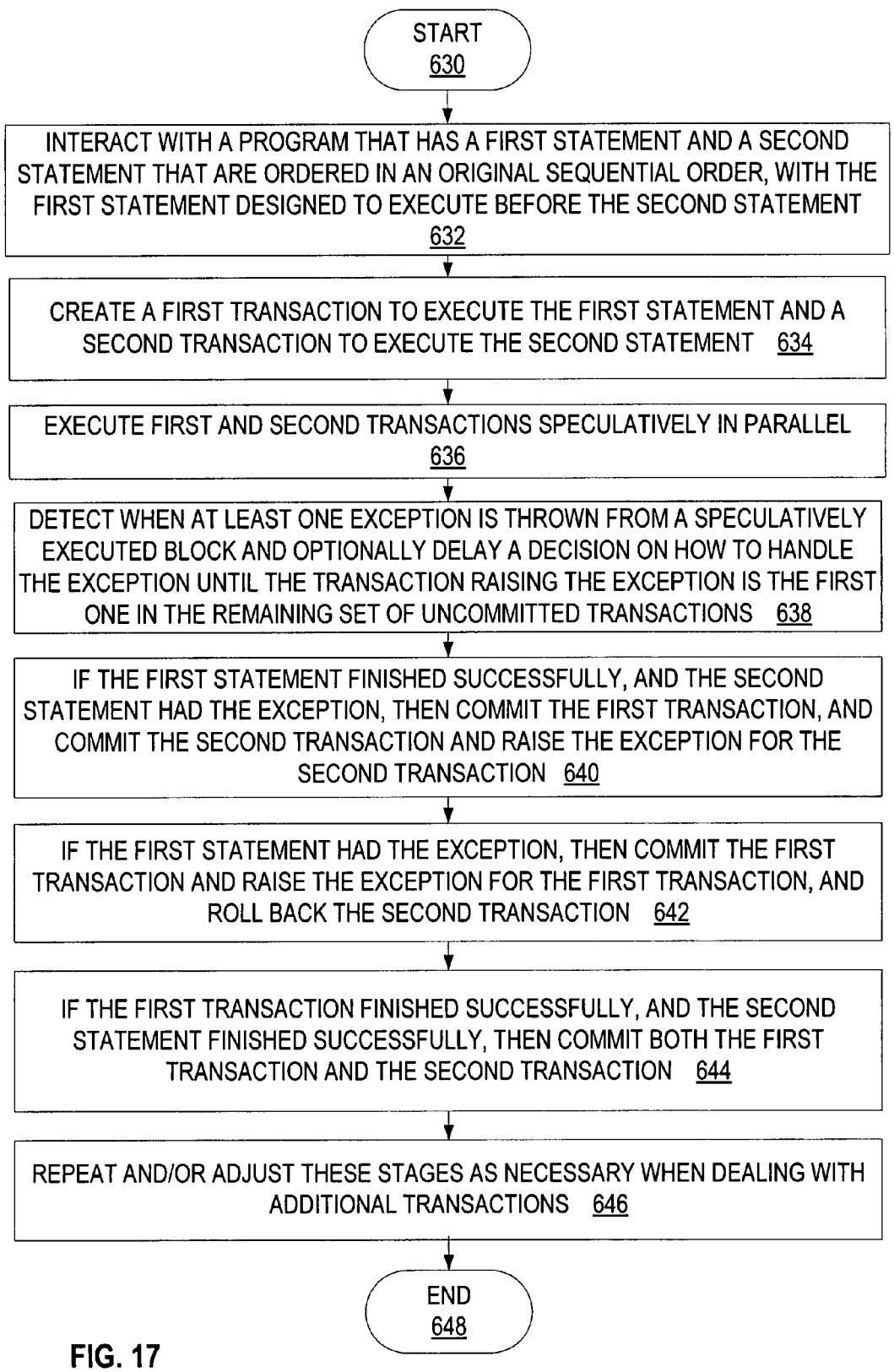
FIG. 17 is a process flow diagram for one implementation of the system of FIG. 1 that illustrates the stages involved in detecting and handling exceptions that occur with sequential statements being executed in parallel.

Turning now to FIGS. 15-17, some diagrams are shown to illustrate handling exceptions that occur when some original sequential statements have been parallelized as ordered transactions. The examples use two statements for comparison, but it will be appreciated that more than two statements can be used with the techniques described herein. The examples are limited to two statements for the purposes of illustration only. Turning now to FIG. 15, one implementation is illustrated of the stages involved in providing a contention manager that ensures exceptions that are thrown from speculatively executed blocks in concurrently executing ordered transactions are handled in a correct order. In one form, the process of FIG. 15 is at least partially implemented in the operating logic of computing device 100. The process begins at start point 570 with statement A and statement B being normally executed sequentially, but where they have been made to execute speculatively in parallel (stage 572). An exception is thrown from one or more speculatively executed blocks (stage 574). The system waits until the transaction that raised the exception is the first one in the remaining set of uncommitted transactions (stage 576). If transaction A finished successfully (decision point 578), and transaction B finished successfully (decision point 580), then both transaction A and transaction B commit in the right order (stage 582).

If transaction A finished successfully (decision point 578), but transaction B encountered an exception from a speculatively executed block (decision point 580), then transaction A commits, and transaction B does a commit and raises the exception (stage 584). The term "commit" as used herein means that the portions of the transaction that executed successfully are committed. If transaction A encountered an exception from a speculatively executed block (decision point 578), then transaction A commits and raises the exception, and transaction B rolls back (stage 586) (regardless of what happened with statement B). The process ends at end point 588.

FIG. 16 is a logical diagram that illustrates a diagrammatic view of the actions for handling exceptions as described in FIG. 15. In one form, some or all of the operations shown on FIG. 5 are at least partially implemented in the operating logic of computing device 100. Suppose there are two statements, statement A and statement B that are in an original sequential order 600. Transactional memory application with exception handling 500 can then take the two statements and execute them speculatively as parallel transactions, called transactions A and B, respectively. The table 602 shows the possible actions that contention manager can take when exceptions thrown out of one or more speculatively executed blocks are raised by statement A and/or statement B. For example, if statement A is successful and statement B is successful, then the system commits transaction A and transaction B (604). If statement A throws an exception from a speculatively executed block and statement B is successful, then the system commits transaction A and raises the exception, and rolls back transaction B (606). If statement A is successful and statement B throws an exception from a speculatively executed block, then the system commits transaction A, and commits transaction B and raises the exception (608). If statement A throws an exception from a speculatively executed block and statement B also throws an exception from a speculatively executed block, then transaction A is committed and raises the exception, and transaction B is rolled back (610). It will be appreciated that while two statements are described in several of the examples herein, that these are just used for simplicity purposes, and there could be any number of multiple transactions using this approach. Furthermore, other variations on commit and rollback combinations are possible in other implementations.

FIG. 17 illustrates one implementation of the stages involved in detecting and handling exceptions that occur from a speculatively executed block from sequential statements being executed in parallel. In one form, the process of FIG. 17 is at least partially implemented in the operating logic of computing device 100. The process begins at start point 630 with interacting with a program that has a first statement and a second statement that are ordered in an original sequential order, with the first statement designed to execute before the second statement (stage 632). The system creates a first transaction to execute the first statement and a second transaction to execute the second statement (stage 634). The system executes the first transaction and the second transaction speculatively in parallel, such as by assigning them to different threads (stage 636). The system detects when at least one exception is thrown from a speculatively executed block and delays a decision on how to handle the exception until the transaction that raised the exception is the first one in the remaining set of uncommitted transactions (stage 638). If the first statement finished successfully, and the second statement had the exception thrown from a speculatively executed block, then the system commits the first transaction, and commits the second transaction and raises the exception for the second transaction (stage 640). If the first statement had the exception thrown from a speculatively executed block, then the system commits the first transaction and raises the exception for the first transaction, and rolls back the second transaction (stage 642). If the first transaction finished successfully, and the second statement finished successfully, then the system commits both the first transaction and the second transaction (stage 644). The system repeats and/or adjusts these stages as necessary when dealing with additional transactions (at the same or later time) (stage 646). The process ends at end point 648.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for handling exceptions in sequential statements being executed speculatively in parallel comprising the steps of:

providing a transactional memory system for managing a plurality of transactions, wherein the transactional memory system is a mechanism for controlling access to shared memory in concurrent computing;

interacting with a sequential program that has a plurality of statements that are ordered in an original sequential order;

creating a plurality of separate ordered transactions to execute the plurality of statements;

executing at least a portion of the plurality of separate transactions speculatively in parallel; and providing a contention manager that ensures that any exceptions that are thrown from one or more speculatively executed blocks while the plurality of separate transactions execute are handled in the original sequential order, wherein the contention manager ensures that if any statement of the plurality of statements in a first transaction of the plurality of separate transactions finishes successfully and any statement of the plurality of statements in a second transaction of the plurality of separate transactions has an exception thrown from a particular speculatively executed block, that the first transaction is committed, and that the second transaction is committed and the exception is raised for the second transaction, wherein the contention manager ensures that if any statement of the plurality of statements in the first transaction in the plurality of separate transactions has an exception thrown from a particular speculatively executed block, that the first transaction is committed and the exception is raised for the first transaction, and that any additional transactions of the plurality of separate transactions are rolled back.

2. The method of claim 1, wherein the contention manager is responsible for managing various types of contention in addition to exception handling.

3. The method of claim 1, wherein the contention manager ensures that if the plurality of statements finish successfully, that plurality of separate transactions are committed in order.

4. The method of claim 1, wherein the contention manager is operable to ensure a correct exception handling behavior between the plurality of statements that were adapted for speculative execution in parallel.

5. The method of claim 1, wherein while at least some of the plurality of separate transactions are being executed speculatively in parallel, at least one exception is detected, and then handled by the contention manager.

6. The method of claim 5, wherein after detecting when the at least one exception occurs, a decision on how to handle the exception is delayed until a particular transaction that detected the exception is a first transaction in a remaining set of ordered uncommitted transactions.

7. A computer-readable medium having computer-executable instructions for causing a computer to perform the steps recited in claim 1.

8. A computer-readable medium having computer-executable instructions for causing a computer to perform steps comprising:
provide a transactional memory system, wherein the transactional memory system is a mechanism for controlling access to shared memory in concurrent computing;
provide a contention manager for managing exceptions that occur between a plurality of statements that were designed to be executed in an original sequential order, and that were transformed into ordered transactions for speculative execution in parallel; and
enable the contention manager to be operable to ensure that any exceptions that are thrown from one or more speculatively executed blocks while the statements are being executed speculatively in parallel are handled in the original sequential order, wherein if a first statement and a second statement of the plurality of statements are being executed speculatively in parallel in a respective first transaction and a second transaction, and if the first statement finishes successfully and the second statement has an exception thrown from a speculatively executed block, the contention manager ensures that the first transaction is committed, and that the second transaction is committed and the exception is raised for the second transaction, and if the first statement has an exception thrown from a speculatively executed block, the contention manager ensures that the first transaction is committed and the exception is raised for the first transaction, and that the second transaction is rolled back.

9. The computer-readable medium of claim 8, wherein the transactional memory system detects when a particular exception occurs in a speculatively executed block in one or more of the transactions.

10. The computer-readable medium of claim 8, wherein the contention manager is responsible for managing various types of contention that occur in the transactional memory system.

11. The computer-readable medium of claim 8, wherein if a first statement and a second statement of the plurality of statements are being executed speculatively in parallel in a respective first transaction and a second transaction, and if the second statement finishes successfully, that the contention manager ensures that both the first transaction and the second transaction are committed in order.

12. The computer-readable medium of claim 8, wherein the contention manager is operable to ensure a correct exception handling behavior between the statements in the sequential program that were adapted for speculative execution s in parallel.

* * * * *